UNITED STATES PATENT OFFICE.

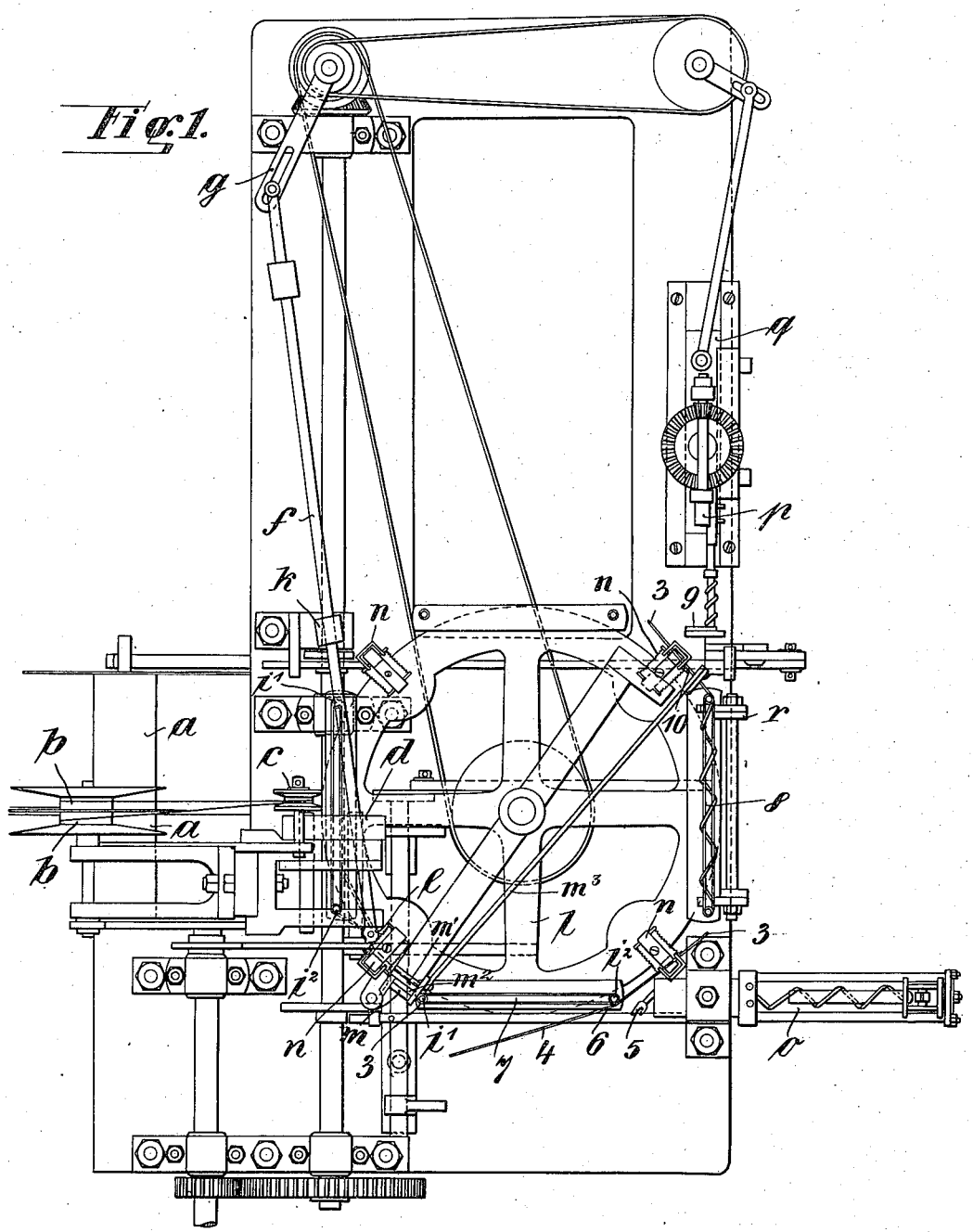

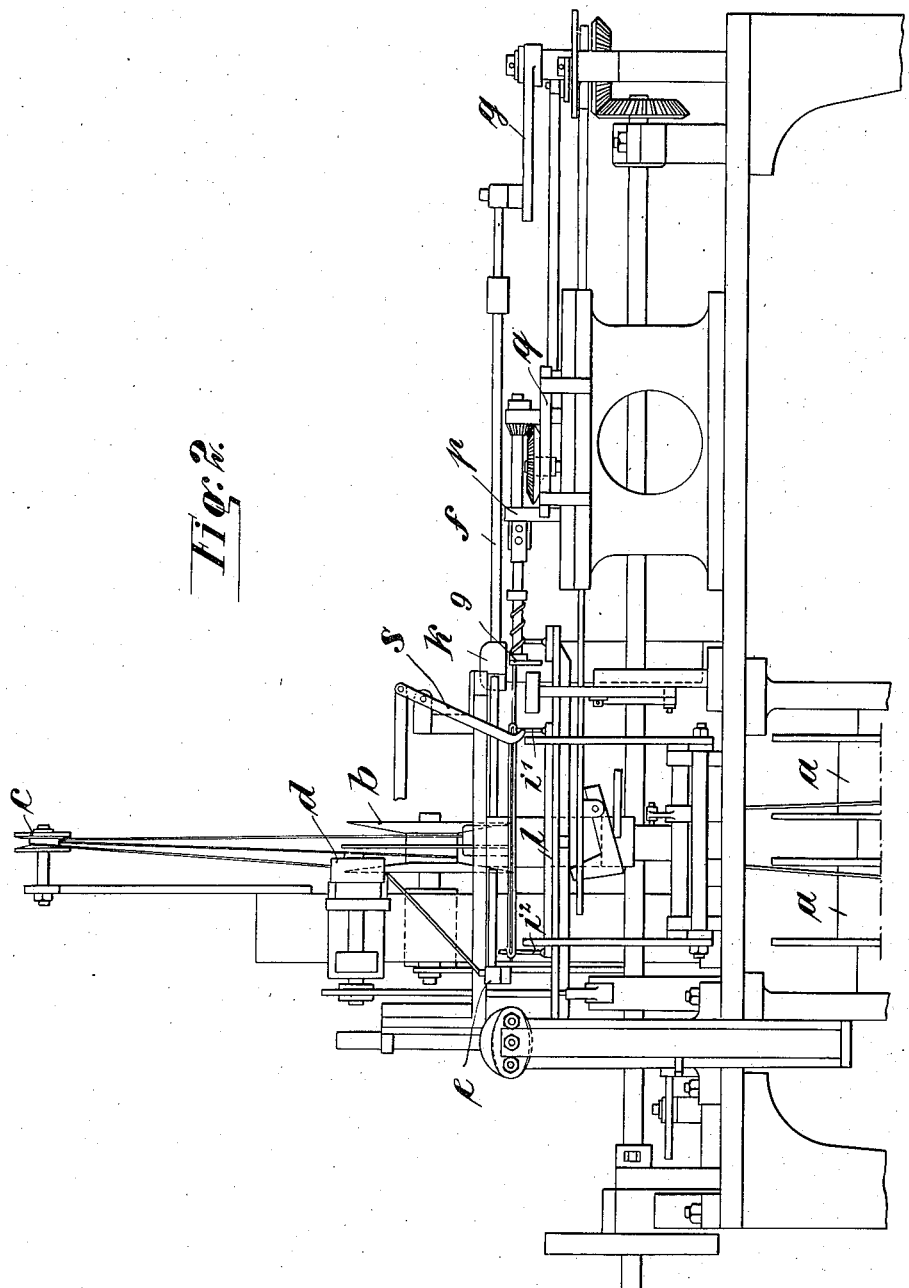

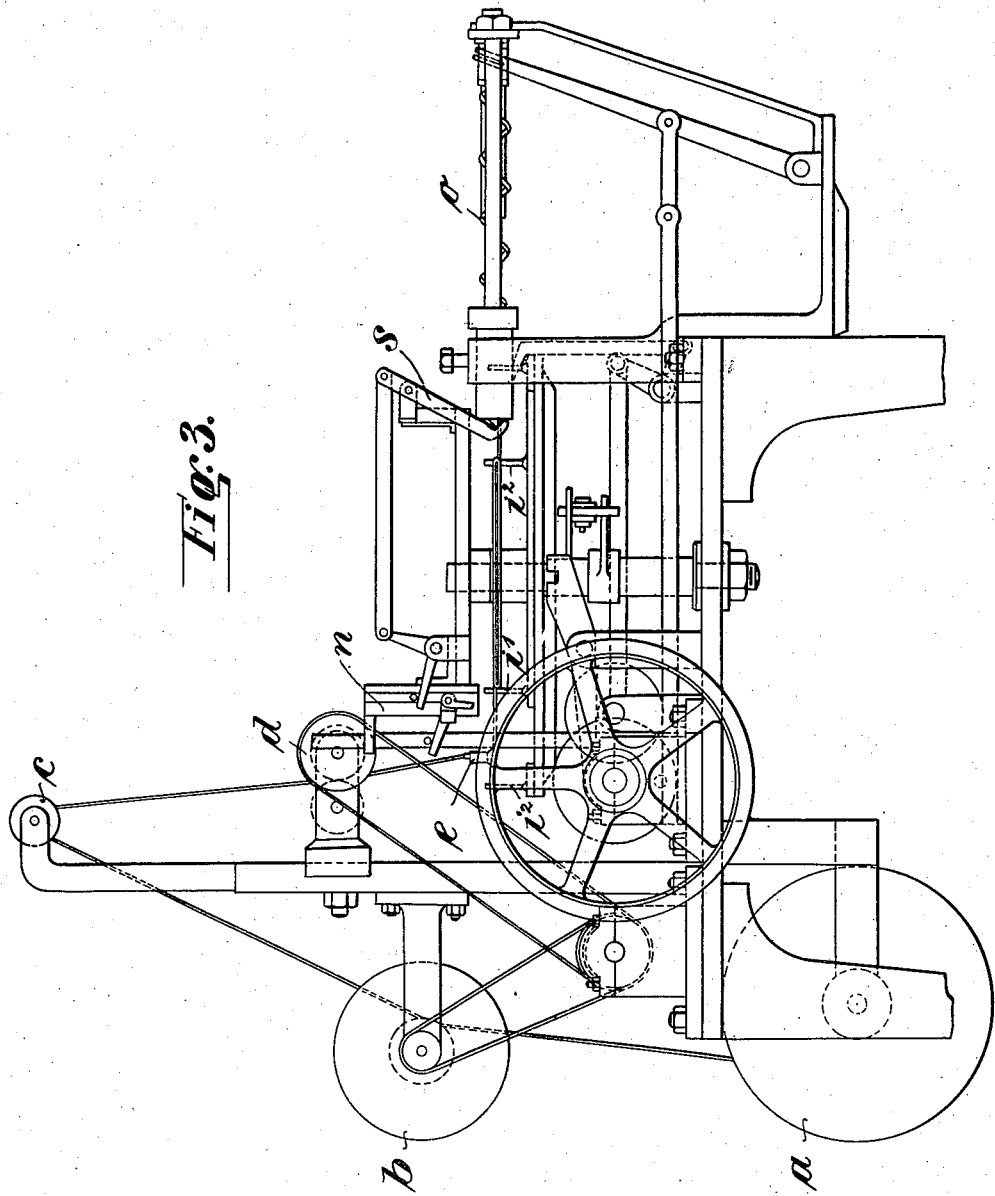

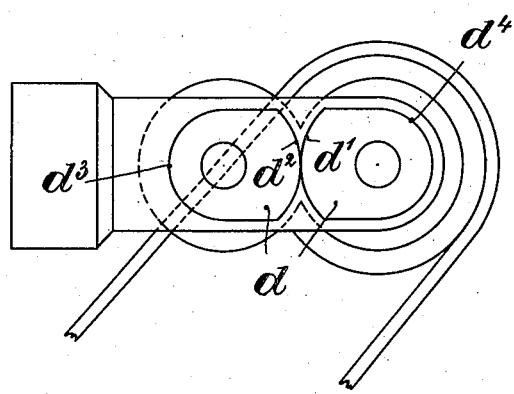
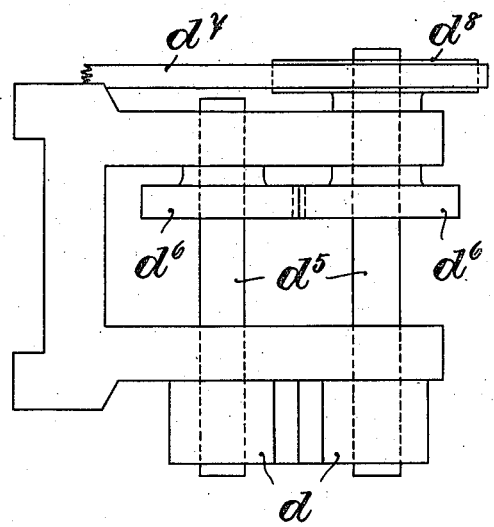

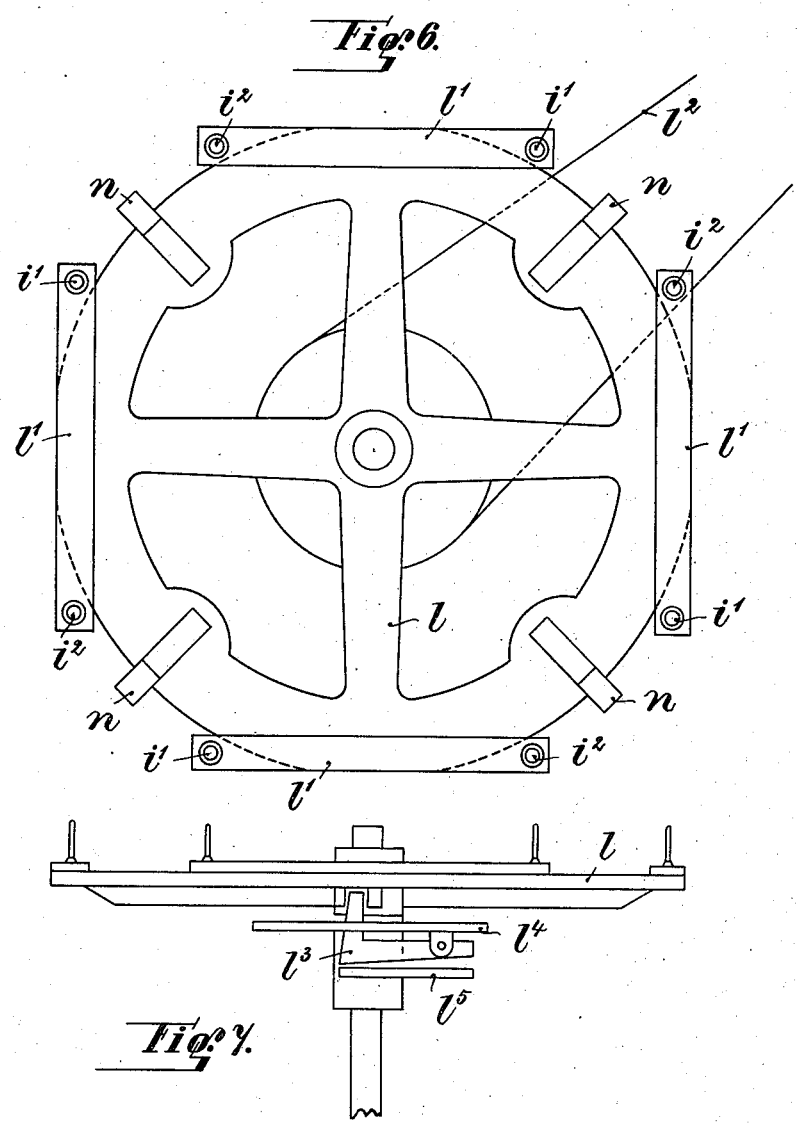

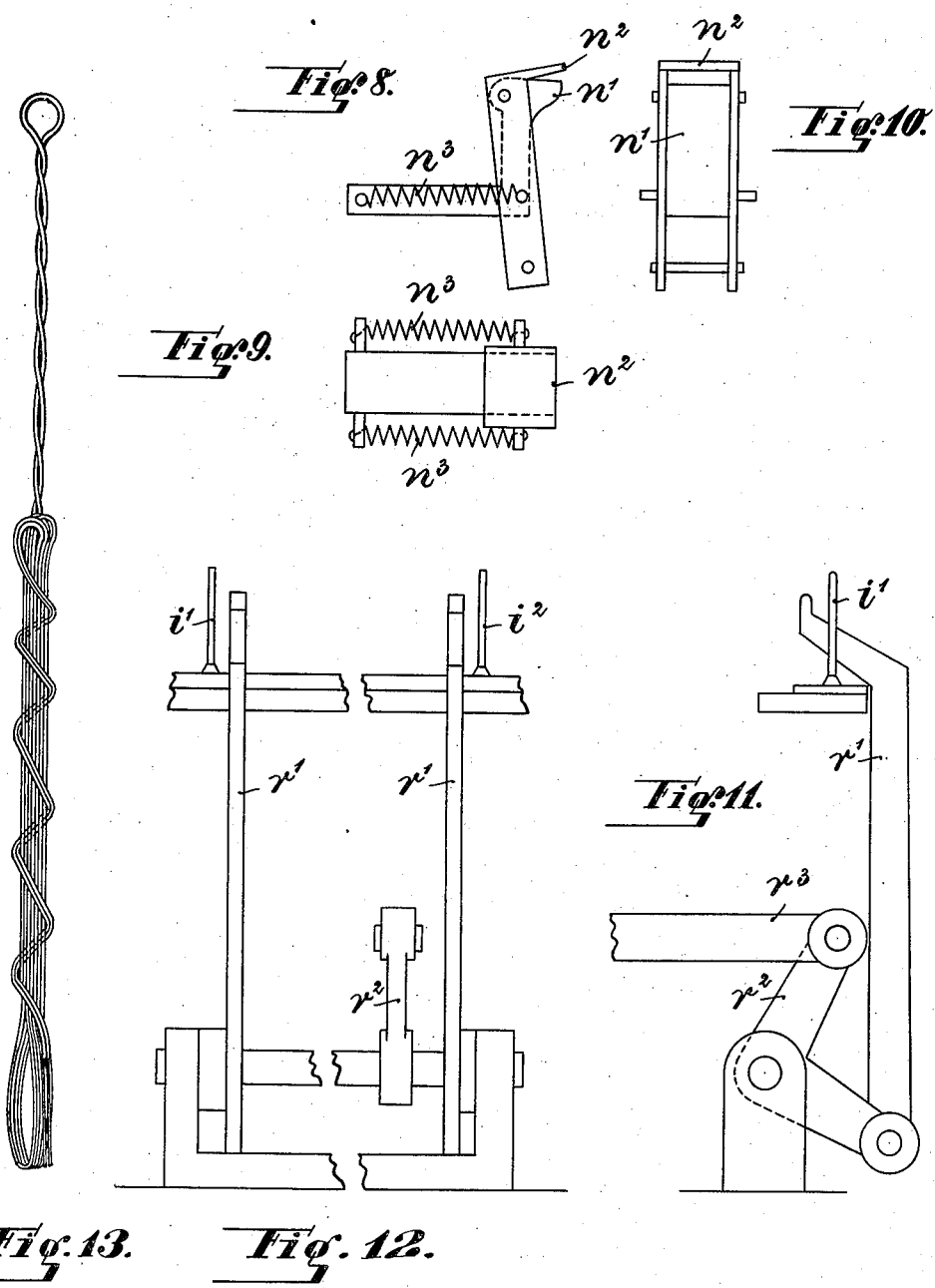

JOHANN KRANNICHFELDT, OF COLOGNE-NIEHL, GERMANY.

MACHINE FOR PREPARING THE CONDUCTING-WIRES OF ELECTRIC IGNITERS.

1,147,516. Specification of Letters Patent. Patented July 20, 1915.

Application filed November 9, 1912. Serial No. 730,391.

*To all whom it may concern:*

Be it known that I, JOHANN KRANNICHFELDT, a subject of the King of Prussia, residing at Cologne-Niehl-on-the-Rhine, in the Kingdom of Prussia and German Empire, have invented a new and useful Improved Machine for Preparing the Conducting-Wires of Electric Igniters, of which the following is a specification.

The invention relates to a machine for winding the current conducting wires of electric fuses, for example electric blasting fuses, into a skein, as has heretofore been done by hand.

The characteristic feature of the invention consists in winding the wires, which are taken from suitable rolls, several times (for example four times) around at least two stationary pins arranged at a distance apart, by means of a suitable winding arm. Around the skein thus formed one end of the two wires can then be spirally wound, and the opposite ends, to which the electric fuse is to be attached, may be twisted together.

The fixed pins around which the wires are wound are carried by a wheel (disk or the like), which is intermittently turned, so that, in one angular position, the wires are wound around said pins to form the skein, in a second angular position, the wires projecting at one end are wound around said skein by means of an automatically guided claw which engages said wires, and, in a third angular position, the ends of the wires are twisted together by a gripping device, which is simultaneously turned and longitudinally moved.

On the drawing a machine constructed in accordance with the present invention is shown by way of example, Figure 1 being a plan, Fig. 2, a side elevation, as seen from the right (Fig. 1), Fig. 3, a front elevation of the same. Figs. 4 and 5 are side and plan views respectively of the gripping or squeezing rolls. Figs. 6 and 7 are side and plan views respectively of the rotary pin carrying wheel, Figs. 8, 9 and 10 are side, front and plan views respectively of the clamp, Figs. 11 and 12 are side and front views respectively of the ejecting device, Fig. 13 is a perspective view of a completed skein.

The wires are drawn off the reels $a$ (Figs. 1 and 3) by the rolls $b$ and led over the rolls $c$ to the intermittently operating gripping or squeezing rolls $d$, which remove the insulation of said wires at intervals corresponding to the free ends of the skeins afterward formed. Said rolls are shown in detail in Figs. 4 and 5. They have a segmental form and grip the wires passing between the arcs $d^1$, $d^2$ and by this squeezing action the insulation is crushed and falls from said wires. The opposite sides $d^3$, $d^4$ of said rolls $d$ do not touch each other so that, when these sides face each other, the insulation is left on the wires. The shafts $d^5$ carrying said rolls $d$ are connected to each other by the spur-wheels $d^6$ and are driven by the belt $d^7$ passing over the pulley $d^8$. After leaving the rolls $d$ the wires pass through the nozzle $e$ of the winding rod $f$ (Fig. 1). This rod receives a reciprocating motion from the crank $g$ (Fig. 1) and is guided by the rotary block $h$, so that the nozzle at the end of said rod is moved in the form of an ellipse around the pins $i^1$ and $i^2$ and winds the wire in several layers around said pins. Four pairs of pins are provided on the wheel $l$. This wheel is shown in plan and elevation in Figs. 6 and 7. The pins $i^1$, $i^2$ are carried by bars $l^1$ secured to said wheel or comprising part thereof and the latter is adapted to be intermittently rotated by the belt $l^2$. This is effected by means of the pawl $l^3$. The disk $l^4$ rotates and causes the pawl $l^3$ to move over a disk $l^5$, which is provided with openings which allow the pawl to periodically fall and come out of contact with the underside of the table. When said pawl is raised by the disk $l^5$ it comes into engagement with openings in the table and rotates the same, but releases said table however when the disk $l^5$ again allows it to fall. In this way the table is arrested every quarter of a revolution, in which period the winding of the wire around two pins is effected. After the wire has been wound around said pins a suitable number of times the wheel again describes a quarter of a revolution and the winding operation is then repeated around the next pairs of pins, etc. After each quarter of a revolution has been completed the shears $m$ (Figs. 1 and 3) are lowered and cut the wires at 3 close to the pin $i^1$ by means of the blades $m^1$, $m^2$ actuated by the rod $m^3$, which rod may be moved by a cam or the like from the main shaft of the machine. The cut wires, owing to their resiliency, assume the position shown at 4, while the wires leading to the nozzle e are held by the clamps n. Such clamps n are provided between each pair of pins $i^1$, $i^2$, as shown in Figs. 1 and 6. Said clamp consists of two jaws $n^1$, $n^2$ (Figs. 8-10) adapted to be pulled together by the springs $n^3$. Thereafter the wire ends 4 are wound around the skein while it is still on the pins. This is effected by the device o, which is guided in a spiral path, and is caused, on being advanced, to turn accordingly. By means of the gripper 5 the wires are taken hold of at 6 and wound around the layers 7, so that a closed skein 8 is formed.

It is now only necessary to twist together the wire ends 3 held by the clamps n, so that they will be rigidly fastened with respect to each other. This is effected by the device p which is mounted on the slide q adapted to be moved backward and forward. During this movement of the device p is operated by gearing, so that it does not turn on being advanced but only on being drawn back again. During the return movement the ends of the wires are caught by the gripper 9 at 10 and twisted together, said wire having been previously drawn out of the clamp n by the lever s, which also assists in pushing the wire into the gripper. As soon as this has been effected the ejecting device r comes into operation, and lifts the skein off the pins by two arms projecting underneath the same. The construction of this ejecting device is shown in Figs. 11 and 12. It consists of rods $r^1$ adapted to be raised by the bell-crank lever $r^2$ which is moved from the main shaft of the machine by the rod $r^3$. When the rods $r^1$ are raised by the bell-crank lever $r^2$ it is evident that their other ends, which are bent at an angle and enter underneath the skein on the pins $i^1$, $i^2$, will raise said skein off the pins.

What I claim and desire to secure by Letters Patent of the United States is:

1. A machine for preparing the conducting wires of electric igniters, comprising in combination, reels carrying coils of wire, pins provided at a distance apart, a rotary wheel carrying said pins, a winding arm to which the wires from said reels are supplied and adapted to be moved around said pins in the same plane and thus to wind the wires into a skein, a knife to cut the skein thus formed from the wires from said reels, means to periodically turn said wheel through part of a revolution, and a spirally guided claw adapted to wind the ends of said wires around said skein, substantially as set forth.

2. A machine for preparing the conducting wires of electric igniters, comprising in combination, reels carrying coils of wire, pins provided at a distance apart, a rotary wheel carrying said pins, a winding arm to which the wires from said reels are supplied and adapted to be moved around said pins in the same plane and thus to wind the wires into a skein, a knife to cut the skein thus formed from the wires from said reels, means to periodically turn said wheel through part of a revolution, a spirally guided claw adapted to wind the ends of said wires around said skein, and a gripper adapted to twist the ends of said wires together, substantially as and for the purpose set forth.

3. A machine for making wire skeins for electric igniters, comprising in combination, reels carrying coils of wire, pins provided at a distance apart corresponding to the length of skeins, a wheel carrying said pins, means to periodically turn said wheel, and a winding arm to which the wires from said reels are supplied and adapted to be moved around and in the plane of said pins, substantially as and for the purpose set forth.

4. A machine for making wire skeins for electric igniters, comprising in combination, reels carrying coils of wire, pins provided at a distance apart corresponding to the length of skeins, a winding arm to which the wires from said reels are supplied, and a rotary member adapted to move the rod elliptically around and in the plane of said pins, substantially as set forth.

5. In a machine for making wire skeins, means for winding a wire into a skein, a cutter for severing the wire, means for winding one end of the severed wire about the skein, and means for twisting the ends of the wire of the skein together.

6. In a machine for making insulated wire into skeins, means for removing the insulations of the wire therefrom at intervals, means for winding the wire into a skein, a cutter for severing the wire, means for wrapping one end of the severed wire about the skein, and means for twisting the ends of the wire of the skein together.

7. In a machine for making wire skeins, spaced pins, means for winding the wire onto the pins, a cutter for severing the wire, means for wrapping one end of the severed wire about the skein, means for twisting the ends of the wire of the skein together, and an ejecting device for removing the completed skein from the pins.

In testimony whereof I have signed my name to this specification in the presence of two subscribing witnesses.

JOHANN KRANNICHFELDT.

Witnesses:
  WALSCHER SCHOLTEN,
  HUBERT DECKER.